(12) United States Patent
Meile et al.

(10) Patent No.: US 11,448,617 B2
(45) Date of Patent: Sep. 20, 2022

(54) EDDY CURRENT SENSOR ARRAY AND EDDY CURRENT SENSOR SYSTEM FOR ADDITIVE MANUFACTURING

(71) Applicant: HEXAGON TECHNOLOGY CENTER GMBH, Heerbrugg (CH)

(72) Inventors: Silvan Meile, St. Gallen (CH); Charles Leopold Elisabeth Dumoulin, Balgach (CH); Matthias Burri, Rheineck (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 100 days.

(21) Appl. No.: 16/682,149

(22) Filed: Nov. 13, 2019

(65) Prior Publication Data

US 2020/0150087 A1     May 14, 2020

(30) Foreign Application Priority Data

Nov. 14, 2018   (EP) ..................................... 18206300

(51) Int. Cl.
    *G01N 27/90* (2021.01)
(52) U.S. Cl.
    CPC ................................ *G01N 27/9006* (2013.01)
(58) Field of Classification Search
    CPC .................................................. G01N 27/9006
    See application file for complete search history.

(56) References Cited

U.S. PATENT DOCUMENTS

| | | | | |
|---|---|---|---|---|
| 5,237,271 A | * | 8/1993 | Hedengren | ........ G01N 27/9046 324/232 |
| 5,399,968 A | * | 3/1995 | Sheppard | ............. G01N 27/902 324/232 |
| 5,532,591 A | * | 7/1996 | Logue | .................... B82Y 15/00 209/567 |
| 5,659,248 A | | 8/1997 | Hedengren et al. | |
| 10,076,879 B2 | | 9/2018 | Bamberg et al. | |
| 2004/0245997 A1 | | 12/2004 | Plotnikov et al. | |

(Continued)

FOREIGN PATENT DOCUMENTS

| | | |
|---|---|---|
| DE | 10 2016 201 290 A1 | 8/2017 |
| EP | 1815936 A1 | 8/2007 |

(Continued)

OTHER PUBLICATIONS

P. Foteinopoulos et al. "On thermal modeling of Additive Manufacturing processes" CIRP Journal of Manufacturing Science and Technology; vol. 20, Jan. 2018, pp. 66-83.

(Continued)

*Primary Examiner* — Noam Reisner
(74) *Attorney, Agent, or Firm* — Maschoff Brennan

(57) ABSTRACT

An additive manufacturing apparatus for manufacture of aluminum parts layer-by-layer, the apparatus comprising an eddy current sensor for in-process measuring of contour and defects of manufactured layers with a defect resolution of at least 0.25 mm. Preferably, the eddy current sensor is embodied as a differential mode line sensor with dual use of sensor coils. Preferably, the array of the line sensor comprises a zig-zag-arrangement of sensor coils with a cross section of 0.15 mm² maximal and with a core with an initial magnetic permeability of at least 5000, preferably a permalloy or metal glass coil core.

13 Claims, 4 Drawing Sheets

(56) References Cited

U.S. PATENT DOCUMENTS

| | | | |
|---|---|---|---|
| 2009/0045820 A1* | 2/2009 | Shimazawa | H01F 17/0006 |
| | | | 324/652 |
| 2010/0007342 A1 | 1/2010 | Lepage et al. | |
| 2012/0123699 A1 | 5/2012 | Katata et al. | |
| 2015/0268099 A1 | 9/2015 | Craig et al. | |
| 2016/0349215 A1 | 12/2016 | Todorov | |
| 2017/0030862 A1* | 2/2017 | Sirois | G01N 27/9006 |
| 2017/0059683 A1 | 3/2017 | Hughes et al. | |
| 2018/0120260 A1 | 5/2018 | Goldfine et al. | |
| 2019/0255654 A1* | 8/2019 | Beckett | B23K 26/032 |
| 2020/0003733 A1* | 1/2020 | Stanton | G01N 29/262 |

FOREIGN PATENT DOCUMENTS

| | | |
|---|---|---|
| EP | 2747934 A1 | 7/2014 |
| EP | 3095539 A1 | 11/2016 |
| WO | 2015118508 A1 | 8/2015 |

OTHER PUBLICATIONS

Extended European Search Report as received in application No. 18206300.8 dated Apr. 26, 2019.

* cited by examiner

EDDY CURRENT SENSOR ARRAY AND EDDY CURRENT SENSOR SYSTEM FOR ADDITIVE MANUFACTURING

CROSS-REFERENCE TO RELATED APPLICATIONS

This application claims priority to European Patent Application No. 18206300.8, filed on Nov. 14, 2018. The foregoing patent application is herein incorporated by reference.

FIELD OF THE INVENTION

The present invention relates to an eddy current sensor array, an eddy current sensor, an additive manufacturing apparatus designed for manufacturing an aluminum object with an eddy current sensor, and an additive manufacturing method for manufacture of an aluminum object.

BACKGROUND

Additive manufacturing (AM) concerns technologies that synthesize 3D-objects by selectively depositing or adding layer-upon layer of material, whether the material is plastic, metal, concrete or polymer.

A common problem with conventional AM machines and processes involves the uncertainty surrounding the integrity and solidity of each layer formed during the build process. Another problem concerns the integrity and strength in the bonding between neighboring layers of material, i.e., lack of fusion. Other physical defects that are typical in AM processes include porosity, fatigue cracks initiating at pores close to surfaces of the AM part, and surface roughness which has been known to affect fatigue life of the workpiece.

In the case of selective laser melting (SLM), selective laser sintering (SLS) or electron beam melting (EBM) additive manufacturing, there are over 50 different process parameters that impact the ultimate quality of finished layers, creating a significant challenge in understanding process physics and developing an effective process control strategy. Broadly speaking, these parameters can be placed into one of four categories: (1) laser and scanning parameters, (2) powder material properties, (3) powder bed properties and recoat parameters, and (4) build environment parameters. These can be further classified into controllable parameters that can be manipulated during a build process and predefined parameters that are determined at the start of a build and remain essentially set throughout the process. Main problems commonly encountered are the presence of pores/cracks and powder movement. The presence of pores results in structural weaknesses of the parts and can cause long term fatigue problems. The diameter of the pores can be substantially less than 50 µm.

A known approach for determining the manufacturing quality of an AM part consists of destructively evaluating a significant number of parts and looking for common defects. There are also non-destructive testing techniques (NDT) to detect defects in an AM part after the build process has finished.

In addition, non-destructive inspection methods during the manufacturing process are known in the art, for example using eddy current sensors. Such in-process or in-situ layer-by-layer inspection is beneficial so as to detect defects as early as possible either to minimize cost of scrap material and/or to allow rework in real-time during the AM build process before it is too late to implement changes. It is also beneficial in that such method provides comprehensive defect analysis without reducing the efficiency of AM production (e.g., time to produce completed part, cost of producing part, energy usage, amount of waste, etc.).

Document DE 10 2016 201 290 A1 discloses multiple NDT techniques for assessing structural & material properties of an AM object. Among thermal systems, also eddy current sensors are superficially discussed.

Document US 2016/0349215 discloses an eddy current system and method for NDT of AM-components, based on an array with at least one exciter coil or a receiver coil or both.

EP 3095539 A1 discloses in-process monitoring of powder bed AM, with simultaneous detection of contour & defects using at least two detection arrays, one for defects and one for edges, potentially aided by a third sensor array, a powder condition eddy current array. Each array uses differential probes, whereby the differential probes consist of a plurality of coils.

EP 2747934 B1 discloses defect characterisation of deposited material layer-by-layer based on the analysis of at least two eddy current scans, whereby each scan has a scan depth of multiple deposition layers.

Hence, eddy current systems for layer by layer inspection of the deposited layers of an additive metal printer are well known and documented in prior art.

However, for small feature sizes and thin wall thicknesses of around 1 mm as typically encountered in weight optimized structures these systems are inadequate. These systems lack in defect resolution as well as the ability to resolve small defects in walls typically encountered in light structures. In addition, the systems cannot be used to measure contours and defects simultaneously except for EP 3095539 A1. However, the system disclosed therein requires at least two different sensors, one for contour and one for defects. Besides the resolution problem in the presence of thin layers, the system according to EP 3095539 A1 also suffers from either cross coupling or a large integration size on the target machine.

Moreover, the state-of-the-art systems typically only work for titanium-based powder alloys $TiAl_6V_4$. As Titanium has a comparatively high electrical resistivity of 18e-5 ohm-cm, eddy currents induced by the overhead sensor are not as strongly attenuated compared to Aluminum based alloy (resistivity 4.8e-6 ohm-cm). For the same penetration depth, the eddy current carrier frequency can be a factor of 30 higher for titanium. FIG. 1 shows the influence of the material conductivity on frequency and penetration depth.

Because of the much higher carrier frequency for titanium, not only the construction of the sensor is relatively easy, but also the signal filtering, as the carrier frequency is much higher compared to the expected frequency of the defect. The frequency range of the defect is determined by the scanning speed, the desired minimal size of the defect as well as the width of the sensor field. More over the signals created by small defect at a given depth are for more attenuated for aluminum compared to titanium.

Due to the difference in attenuation, field penetration in the deposited material for titanium at high frequencies is much higher compared to aluminum base material. In addition, the difference between the carrier and the signal is much higher for titanium. This results in a much simpler low pass filtering/lower signal generation effort.

Thus, there is a need for an AM manufacturing apparatus for manufacture of light aluminum parts with in-process inspection of the part.

BRIEF DESCRIPTION OF THE INVENTION

It is therefore an object of some aspects of the present invention to provide a sensor and an AM-manufacturing apparatus for in-process inspection of thin-wall aluminium objects.

In some embodiments, the present invention relates to an additive layer manufacturing apparatus designed for manufacturing an aluminum object layer-by-layer, such as weight optimized aluminium AM-parts used in manufacturing of aircrafts, more generally spoken of a thin wall aluminum object i.e. a three dimensional aluminum structure in which one dimension is small compared to the other two dimensions. The apparatus comprises a deposition device for depositing an aluminum powder onto a layer or powder bed and a heating device for consolidating deposited powder, for example a laser beam or electron beam.

The apparatus further comprises an eddy current sensor designed for in-process measuring of contour/topography and defects—such as pores or powder movement—of aluminium layers of the aluminum part in a single pass. The eddy current sensor has a defect resolution of 0.25 mm or finer, preferably a defect resolution of 0.15 mm in 1 mm thin aluminum walls. In other words, the apparatus advantageously has an eddy current sensor which enables in-situ or real time inspection of aluminum layers with fine defect resolution during the layer-by-layer production of the workpiece. The eddy current sensor not only allows defect inspection, but also inspecting or monitoring contour; e.g. after each layer is added, after every other layer is added, or after a group of successive layers is added. Thus for example each aluminum layer is examined before a subsequent aluminum layer is built on top of it. Such a layer-by-layer inspection is beneficial so as to detect defects as early as possible either to minimize cost of scrap material and/or to allow rework in real-time during the AM build process of the aluminum object.

Preferably, the eddy current sensor is embodied as an eddy current line sensor movable with respect to the layer bed, particularly whereby the sensor covers the whole width of the layer bed. Thus, the line sensor can be moved in one direction above the layer bed resp. a manufactured layer and the layer can be fully inspected in this single measurement movement over the layer. In apparatus having a recoater movable with respect to the layer bed, it is preferred to attach the eddy current sensor to the recoater resp. to the drive mechanism moving the recoater, thus allowing for measuring and recoating together.

Optionally, a controller of the apparatus is designed such that measurement results of the single pass are refined by a second eddy current measurement pass, e.g. the measurement resolution is improved (finer resolution of defects and/or contour) and/or defects detected in the first pass are further characterized by the second pass, e.g. type or sort of defect. In particular, the second pass is performed during a return movement of a drive mechanism of the eddy current sensor (and recoater). In AM-apparatuses with only one powder bed, a return movement after the recoating forward movement is necessary anyway, thus a second inspection pass does not mean any delay in manufacturing. The second measurement pass is optionally done with a lateral offset to the movement direction compared to the first pass and/or with changed measurement parameters of the sensor.

In preferred embodiments, the eddy current sensor has measurement depth or penetration depth in the millimetre-range and the measurement depth and/or the measurement resolution is variable, the variable measurement depth allowing for flexible adaption to different manufacturing or measuring conditions.

In some embodiments, the apparatus comprises a temperature sensor designed for in-process measuring of local temperatures of a layer parallel to the eddy current measurement, in particular wherein the eddy current sensor and the temperature sensor are integrated in a common sensor head movable above the layer bed.

Preferably, the apparatus is designed such that measured temperatures are used for correcting measured contours based on the measured temperatures, using a thermal expansion model of the aluminium object/layer stored in a storage of the apparatus. As local temperatures are relatively high during AM-aluminum manufacture because of the consolidation procedure, considering temperatures in measuring contours improves the measurement result.

Optionally, the apparatus comprises a feedback-loop, the feedback-loop being designed to adapt the additive manufacturing and/or eddy current measuring in real-time based on measurement data provided by the eddy current sensor. As a further option, the eddy current inspection can be adapted with respect to magnetic polarities of sensor coils and/or measurement frequency, i.e. the excitation frequency of the sensor coils is variable and therewith all frequencies dependent thereof/connected with.

Optionally, the apparatus comprises an electronic processor and storage designed for computation of a 3D-model of the object based on measurement data provided by the eddy-current sensor. In embodiments with a temperature sensor as described above, the measured temperatures are considered in computing the 3D-model, too, e.g. using the above mentioned thermal expansion model.

As another option, the apparatus is designed such that it can perform an ISO-3D-finite filtering across multiple layers as part of the eddy current measuring, in particular with a weight factor for each layer plane axis and/or layer.

Some embodiments of the invention also relate to a differential mode eddy current line sensor comprising a plurality of n sensor coils, wherein the n sensor coils are mounted and drivable in parallel, the differential eddy current sensor being a preferred embodiment of an eddy current sensor for the aluminum AM-apparatus described above. Further, a respective sensor coil of the differential eddy current sensor forms a differential sensing probe with the adjacent sensor coil to its one side as well as with the adjacent sensor coil to its other side, the line sensor therewith providing n−1 differential sensing probes. Said otherwise, each coil (besides the two outmost coils at each end of the sensor line, of course) is part of two coil pairs, with both of its neighboring coils.

In addition, each sensor coil is directly electrically interconnected to a respective emitter gain stage, wherein the emitter gain stages preferably serve as demodulators.

Optionally, the eddy current line sensor comprises n−1 differential amplifiers, each for a respective sensor probe, whereby the sensor coils of a respective sensor probe are interconnected to a respective amplifier by way of one of the emitter gain stages each.

As another option, the differential sensor comprises a dual stage op-amp circuitry with a third order low-pass filter, particularly wherein the cut-off frequency of the low-pass filter is about the double of the maximal mechanical frequency of the eddy current line sensor.

Optionally, a respective emitter gain stage has a high current gain and/or low noise and/or comprises a transistor.

Preferably, the magnetic polarity of sensor coils of the eddy current sensor is selectable through a selectable current direction, in particular in order to enable enlarged differential sensor probes out of more than two sensor coils each wherein a first part of these sensor coils has same magnetic polarity and the other part of the sensor coils has inverse magnetic polarity. For example, instead of sensor probes of two single coils, sensor probes out of four sensor coils can be established, with each two coils having same polarity.

Optionally, the eddy current line sensor has a driver or measurement frequency between 30 kHz and 300 kHz, in particular between 60 kHz and 140 kHz, and/or a variable measurement frequency.

As further options, the eddy current line sensor comprises a thermally cooling printed circuit board (PCB), and each coil is connected through a thermally conducting joint to the thermally cooling PCB. This enables excellent thermal stability of the coils. Preferably, the PCB has a metal core that is connected to ground, enabling excellent cooling/thermal stability and in addition, the coils are thereby electrically grounded.

As another option, the PCB is modular by comprising printed circuit board modules and/or comprises a signal processing board split into a separate analog board and a separate digital board.

Some embodiments of the invention also relate to an additive layer-by-layer manufacturing method of an aluminum object, the method comprising the steps of deposing aluminum onto a layer bed, consolidating the deposited aluminium layer, in particular by laser light, and in-process single pass measuring of contour and defects of at least one manufactured layer with eddy current sensor, preferably with the differential eddy current sensor described above.

Optionally, the AM-method comprises a forward and return movement relative to the layer bed and the single pass measurement is refined, in particular in enhancing measurement resolution and/or characterizing defects, by a supplemental pass during return movement, with a lateral offset of the sensor orthogonal to the movement direction and/or different magnetic polarities of sensor coils and/or different measurement frequencies between the forward and the return movement and/or different height of the sensor to the aluminum layer.

As another option, the method comprises the step of an ISO-3D-finite filtering across multiple layers, in particular with a weight factor for each layer plane axis and/or layer and/or a step of measuring local temperatures of a layer and correcting measured geometries, in particular the measured contour, based on the measured temperatures, using a thermal expansion model.

Optionally, the method comprises the step of comparing measurement data of the sensor with stored reference data, in particular CAD-data of the object.

Some embodiments of the invention also relate to a computer program product having program code which is stored on a machine-readable medium, in particular of an AM-apparatus as described above, or embodied as an electromagnetic wave, the program code being configured to control and carry out the described additive layer-by-layer manufacturing method of an aluminum object.

Some aspects of the invention also relate to an eddy current sensor array formed by a plurality of sensor coils. The eddy current sensor array is a preferred embodiment of a sensor array of the differential eddy current sensor described above. The sensor coils of the eddy current sensor array have a (geometric) cross section of 0.15 mm² maximal, in particular 0.04 mm² maximal. In addition, each coil has a core with a high initial relative magnetic permeability of at least 5000 (with reference to the International System of Units, SI-system), preferably embodied as a permalloy core and/or amorphous metal core.

Further, the sensor coils are lined up along a line, wherein each two successive sensor coils (successive in direction of the line) are alternately offset to the line such that the distance between the centres of each two successive coils in direction of the line is less than the straight distance between the centres. The chain of sensor coils is so to say (partly) "folded" (compared to a straight chain). This arrangement allows for a denser coil arrangement in direction of the line than a simple chain of sensor coils, even if the sensor coils of the simple chain touch each other. Preferably, the offset angle (with respect to the line) is between 30° and 75°, in particular 45° or 60°, and/or the sensor coil density in direction of the line is at least five coils per millimeter.

Preferably, the eddy current sensor array comprises a thermally conductive base, whereby the coils are fixed by one end of a respective core onto the base and a respective core is thermally connected to the base. Preferably, the base is electrically conductive and grounded and the sensor coils are one side electrically connected to the base, and thus grounded. Grounding of the cores has the advantageous effect that any antenna-like behaviour of the coils is minimized which otherwise could have negative effect on amplifiers used with the sensor array as the coils would act like short bar antennas with frequencies in the range of 100 GHz.

Optionally, a respective core is protruding above the winding with a protrusion, the protrusion extending at least one turn of the coil winding or one diameter, preferably three times the diameter, of the winding wire used. As another option, the sensor array comprises a capacitor connected in parallel to a respective sensor coil.

Preferably, the eddy current sensor array comprises a thermally conducting and electrically insulating encapsulant encapsulating a respective sensor coil and/or a respective coil winding. Optionally, the encapsulant has a Total Mass Loss (TML) of 1% maximum (according to standard measurements) and/or has a Thermal Expansion Coefficient (CTE) equivalent to the Thermal Expansion Coefficient of a sensor array's printed circuit board and/or is temperature stable and shows low outgasing at least up to 120° Celsius, particularly up to 200° C.

Some embodiments of the invention as described above overcomes the shortcomings of other known eddy current AM inspection systems in the art in that the sensor and apparatus presented can detect small defects in ~1 mm thick aluminum walls with simultaneous detection of contour (deviations) in a single pass using a single sensor array.

BRIEF DESCRIPTION OF THE DRAWINGS

The device according to the invention and the method according to the invention are in this case furthermore described in greater detail purely by way of example below on the basis of concrete exemplary embodiments illustrated schematically in the drawings, further advantages of the invention also being discussed. Specifically in the figures.

DETAILED DESCRIPTION

Figure 2A:
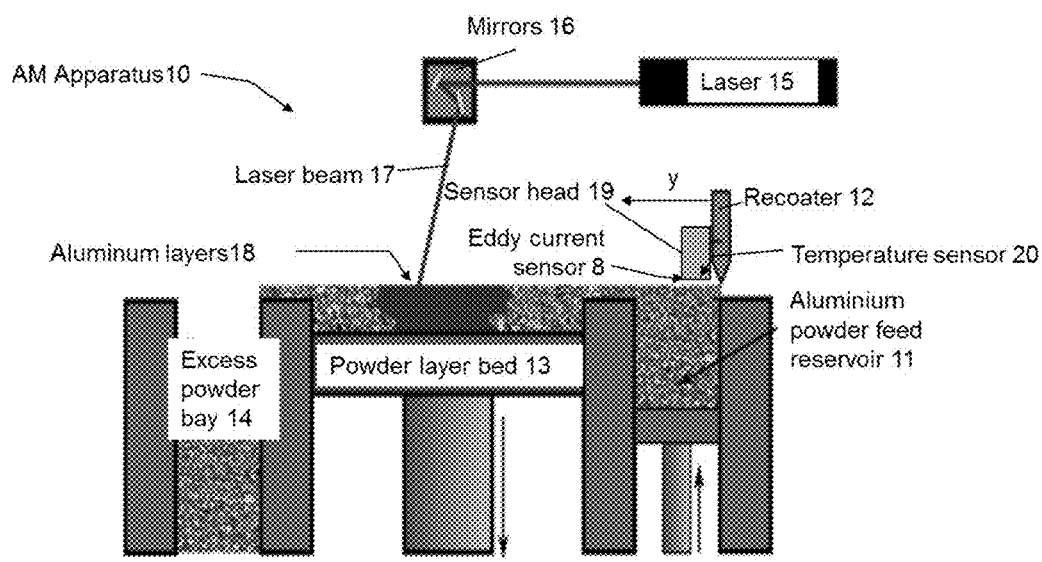
FIGS. 2a-c show a side view of an AM-apparatus according to the invention, having an eddy current sensor, and two examples for eddy current measurement results.

FIG. 2a shows an additive layer manufacturing apparatus 10 designed for forming an aluminium object layer-by-layer, having a sensor head 19 for inspection of manufactured aluminium layers 18. As known in the art, the AM apparatus 10 comprises a powder reservoir 11 with an elevator in the powder reservoir which lifts a prescribed dose of powder above the level of a build plate or layer bed 13, the layer bed having a length (in y-direction) and a certain width, defining the maximum layer size. The powder dose is then spread in a thin even layer over the build surface by a recoater mechanism 12, the recoater 12 covering the whole width of the powder bed 13. The recoater mechanism 12 may consist of a hard scraper, soft squeegee, or roller. Alternatively, powder may also be supplied by a hopper from above the build surface. The powder layer thickness is typically between 10 and 100 µm. Selective portions of the powder layer corresponding with a slice of the part to be manufactured are then sintered or melted by a focused laser beam 17, emitted by a laser 15, scanning across the surface with the help of mirrors 16. A laser 15 in the metal powder bed system is typically fiber lasers with wavelengths in the 1.06-1.08-µm range and powers on the order of magnitude of 100s of Watts. Excess powder is collected in an excess powder bay 14.

The process is repeated to build up a finished part in a layer-by-layer fashion, building one aluminum layer 18 on top of the other. The process is typically carried out in a nitrogen or argon atmosphere or vacuum, with very low oxygen content to prevent oxidation of the aluminum during the fusion process.

Further, the apparatus 10 comprises a sensor head 19 with an eddy current sensor 8 having a line sensor array, the sensor array in form of a line covering the whole width of the powder layer bed 13. The sensor 8 is movable in y-direction above the layer bed 13 resp. above an aluminum layer 18 in the bed 13, e.g. at a height of about 0.1 mm above the layer 18, thus the sensor line is gradually moved over the whole layer bed 13, wherefore the whole layer 18 is measured in-process or in-situ. In the example, the sensor head 19 is mechanically coupled to the recoater 12 such that both devices 12, 19 are moved together over the layer bed 13. Alternatively, the sensor 8 has its own drive mechanism and/or is embodied as an area sensor instead of a line sensor as shown.

The eddy current sensor 8 is designed such that it does not only measure contour or topography of the (topmost) aluminum layer 18 of a weight optimized aluminum object, but detect defects of one or more aluminum layers 18, such as pores or powder movement, in a single pass, with a defect resolution of 0.25 mm or finer in 1 mm or 0.5 mm thin walls. For example, defect resolution (at room temperature) is 0.150 mm in 0.5 mm thin walls during sensor movement parallel to the walls whereas at orthogonal sensor movement with respect to the orientation of the walls the defect resolution is 0.250 mm in 1 mm wide walls. Preferably, the eddy current sensor 8 has a depth of penetration/defect depth of about 1 mm at a defect resolution of 0.25 mm or finer.

Thus, real-time inspection of the light-weight aluminum AM object is provided, without any delay of the AM process. In the example, the eddy current sensor 8 enables to inspect at least the topmost consolidated aluminum layer 18 with respect to both contour and flaws when passing over the layer 18 together with (and directly before) the recoater 12 spreading out new powder.

Figure 2B:
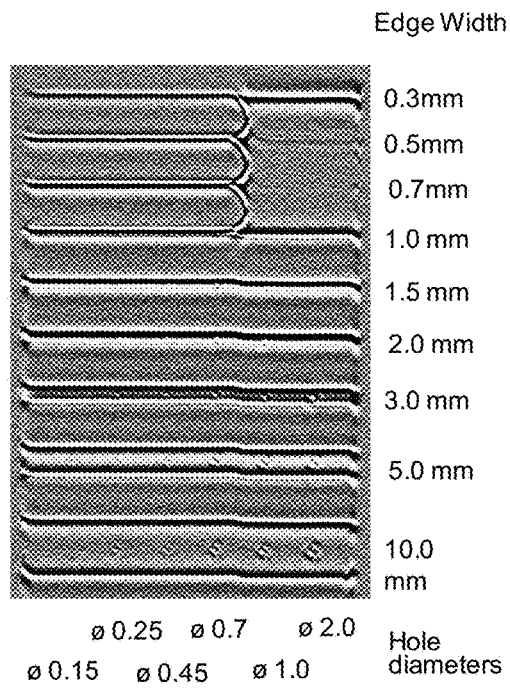
Figure 2C:
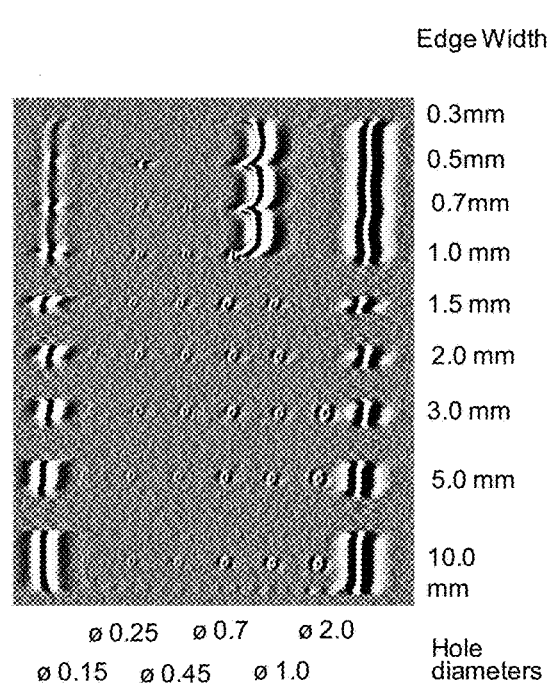

A measurement example is given in FIGS. 2b and 2c. FIG. 2b illustrates the result of an orthogonal scan across an aluminum edge plate with 0.1 mm deep buried holes (0.1 mm material on top of the cylindrical hole) with hole diameters of 2.0 mm, 1.0 mm, 0.7 mm, 0.45 mm, 0.25 mm and 0.15 mm across edges of 10 mm, 5 mm, 3 mm, 2 mm, 1.5 mm, 1.0 mm, 0.7 mm, 0.5 mm and 0.3 mm width. FIG. 2c shows the result of a measurement pass in parallel to the edges of an aluminum edge plate with 0.1 mm deep buried holes (0.1 mm material on top of the cylindrical hole) with hole diameters of 2.0 mm, 1.0 mm, 0.7 mm, 0.45 mm, 0.25 mm and 0.15 mm across edges of 10 mm, 5 mm, 3 mm, 2 mm, 1.5 mm, 1.0 mm, 0.7 mm, 0.5 mm and 0.3 mm width.

Preferably, the eddy current sensor 8 accommodates a wide measurement or driver frequency range and/or selectable frequencies, e.g. between 30 kHz to 300 KHZ or even 1 MHz or between 60 kHz and 160 kHz. Optionally, the sensor 8 can simultaneously transmit multiple frequencies (e.g. low frequencies for better penetration, high frequencies for surface defects). As an option, the detection depth or resolution is changed or changeable for each layer 18 based on one or multiple of selected excitation frequency or dynamic arrangement of eddy current sensor coils. Change of detection depth or resolution is optionally achieved within a layer by dynamic on-the-fly-reconfiguration of the system.

Optionally, the apparatus 10 or rather an apparatus' controller comprises a feedback-loop being designed for in-process or real-time adaption of the layer manufacture and/or the layer inspection based on measurement data provided by the eddy current sensor 8 and/or the temperature sensor 20 further described below. In other words, the layer deposition, solidification or consolidation and/or the layer measuring are modified according to measurement data of at least one of the inspection sensors 8, 20. For example, the sensor frequency and/or the eddy current direction are changed based on measurement data. As a further option, the sensor 8 accommodates multiple excitation signal shapes: sinodial waves, square waves, pulsed.

As another option, the AM-method comprises filtering of measurement deviations by ISO 3D finite difference. Upon availability of each new measured layer 18, the filter needs to be re-computed. The result is then inputted at the layer half a filter depth below the current layer 18. If the filter depth does not exceed the reach of the printer depth (number of layers 18), then the result can be used as an input for correction of the writing or manufacturing process of the next layer.

Such a multiple layer 3D filtering process can be quite computational intensive. The waiting period of the laser writing process after the powder feeding is short. The intensive computations therefore need to be completed in a short time. As the computations of the filters are highly parallel, these can be distributed to the GPU and to multiple cores inside an apparatus' computer (parallel processing) or computer cluster.

As another option, AM manufacturing resp. AM-inspection method according to the invention comprises generating a 3D-model of the AM-object based on the measurement data of the eddy current sensor, using an apparatus' electronic processor. In other words, the inspection results of the underlying layers 18 are merged into a 3D visualization. Furthermore, optionally the data of each layer is used in an additional 3D filtering process to further enhance the data/characterize the defects/for contour enhancement. If the layer decomposition is known e.g. by a CAD-model, also the CAD-data is optionally used for a-prior filtering of the measurement data.

Because of the cooling and associated thermal contraction of the layers 18 or the AM-workpiece, the 3D data/visualization might not represent the as build part completely correct. In addition, without thermal correction deviations between the CAD/the designed reference of each layer and the as build layer 18 may exist.

To overcome these problems, the present exemplary apparatus 10 as shown in FIG. 2a comprises besides the eddy current sensor 8 at least one, preferably a plurality of temperature sensors 20 in the sensor head 19 along the sensor line. By means of the integrated temperature sensor, the local temperature of the target 18 can be measured. The measured temperature is used for thermal expansion correction of the measured contours of the AM-part through thermal expansion models. Using the thermally corrected layers 18 the as measured model can show correct progress and contour errors/defects. Thus, a 3D-image of the object can be provided with heat or thermal expansion contour correction. This thermal correction of the part enhances the precise comparison of the as build part with a stored reference model, too.

Figure 3A:
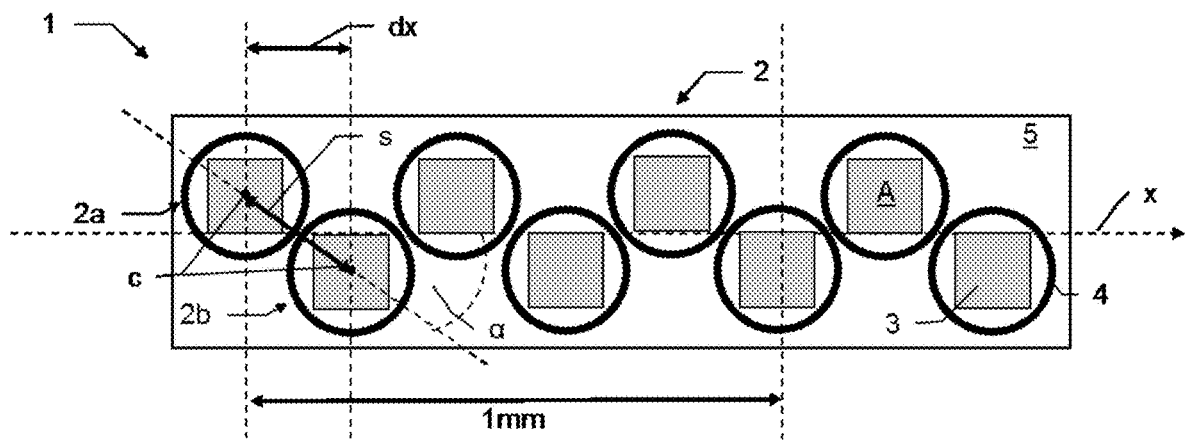
FIG. 3a shows a top view of an eddy current sensor array according to the invention.

FIG. 3a shows in a top view an exemplary eddy current sensor coil array 1 which can be used for an eddy current sensor 8 of the AM-apparatus shown in FIG. 2, the sensor array 1 formed by a plurality of small wire wound sensor coils 2. Each of the sensor coils 2 comprises a core 3 and a winding 4 around the core 3, e.g. two layers of copper wire winding. Preferably, all sensor coils 2 are equal as shown, which makes manufacture of the array 1 easier but optionally the array 1 comprises for example two coil types e.g. of different size, whereby the coils 2 have a maximum geometric cross section A of 0.15 mm$^2$, preferably 0.04 mm$^2$ or less. Such very small coils or micro coils 2 are particularly advantageous for measuring of additive manufactured objects or layers of material, particularly of weight-optimized aluminium structures. The small size is advantageous in reducing influence of disturbances such a thermal variation of the manufactured workpiece, variation of a surface/layer depending on layer thickness and/or trajectory of a laser a layer is consolidated with.

Figure 1:
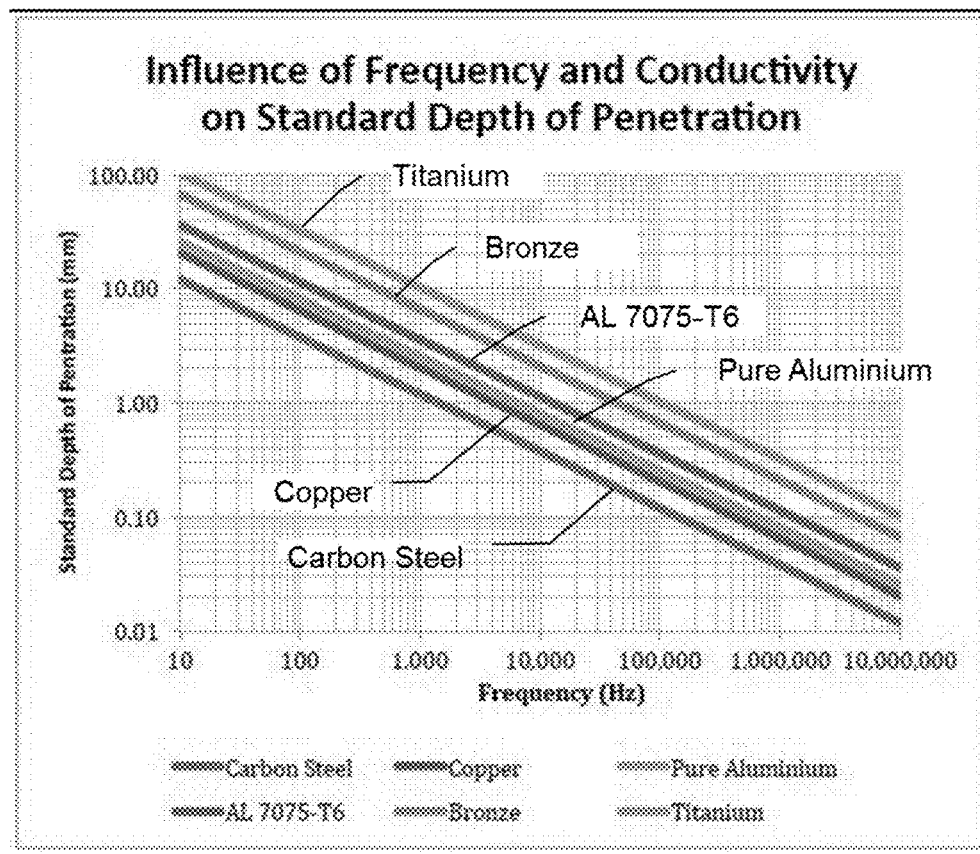
FIG. 1 shows a diagram of depth of penetration in dependence of conductivity and frequency.

In case of a selective laser melting (SLM) process with an apparatus as shown in FIG. 1, after writing of a layer, the laser pauses for a brief moment. This allows for solidification of the molten material before the part is exposed to deposition of a new powder layer. The inspection of the deposited layer with an eddy current sensor having the exemplary eddy current sensor array 1 as depicted in FIG. 3a occurs during the cooling phase at the time when the new powder layer is deposited. Due to the different cooling times of the material deposited at this stage, thermal variations exist. In addition, the part is pre-heated to an arbitrary temperature (process dependent) typically between 50° C. and 250° C. At these temperatures, the conductivity of aluminum reduces by a factor of up to two compared to room temperature. This change in conductivity results in a higher penetration depth of the solidifying part at a given frequency compared to room temperature.

To reduce the influence of these disturbances (thermal variation of the part, surface variation of the part depending on wall thickness/laser trajectory), the size of the coils 2 is made very small (thereby considering S/N ratio). In the case of cylindrical coils 2 as in the example, they have e.g. a diameter of 0.2 mm with a size of the core 3 of e.g. 0.125 mm. Cylindrical coils have the advantage of better penetration of a target or better field depth of the target.

In addition, the coils 2 are arranged "beyond" close. As shown, the sensor coils 2 are lined up along a line x. In order to increase the coil density—and therefore the measurement resolution—in comparison to the maximum coil density in direction of the line x in case of a simple stringing together of coils, the sensor coils 2 are alternately offset to the line x, the line x then representing a median x. Due to this zig-zag-arrangement, more sensor coils 2 per millimeter in direction of the line x are present than would be possible by simply lining up of the coils without offset, even if the coils would touch each other. In the example, there are five coils per millimetre whereas in case of a simple coil line the coils density in x-direction would be maximal four (and a fraction less than half).

Due to this "squeezed" arrangement of sensor coils 2, the distance of the centres c of two successive coils in direction of the line x is less than the straight distance s between these centres c, as shown in the figure for the two coils 2a and 2b. The coils 2 are arranged such that each successive five coils form a W-like structure whereby the angle of intersection of the "W" or offset angle $\alpha$ is between 30° and 75°, preferably between 45° and 60°. The constructing angles $\alpha$ of the array 1 of for instance 45° facilitates coil placement (bigger coil spacement dx) and less coil to coil interference. When choosing a constructing angle $\alpha$ of 60°, the coil density can be further increased/larger coils 2 can be chosen to cover the same inspection path.

For best field penetration at a target to be measured, the coils 2 are alternatingly oriented in north/south direction/left hand sided/right hand sided winding 4. Alternatively, the coils 2 may be unsorted and placed in a random arrangement. As another alternative, the coils may be grouped to generate stronger fields (which go deeper into the material, with less geometric resolution). The line the coils 2 are lined up along needs not to be a line in the mathematical sense. Instead of a straight line x as shown in FIG. 3a, the coils 2 may be lined up along a curved or bent line, for example as shown in following FIG. 3b.

Figure 3B:
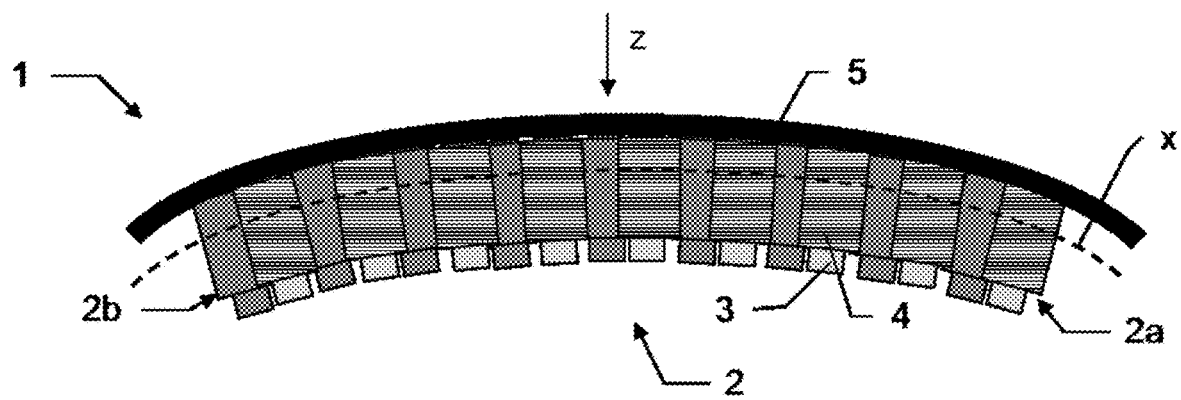
FIG. 3b shows a side view of another eddy current sensor array according to the invention.

FIG. 3b shows a simplified side view of an eddy current sensor coil array 1. The base 5 and therewith the line x of sensor coils 2 is curved. In the side view, due to the alternating offset, the first row of coils 2a is in the foreground and the second row of coils 2b (colored in dark grey) is in the background, with the foreground coils 2a partly overlaying the background coils 2b. A curved or non-straight arrangement of coils 2 resp. a bent sensor array 1 may be for example advantageous for measuring curved AM-layers/AM-workpieces.

Figure 4:
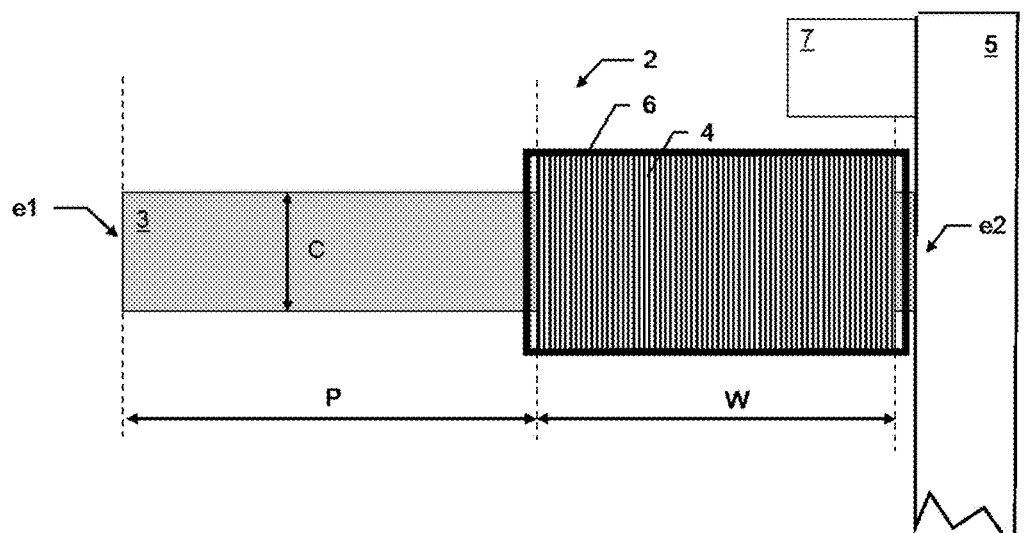
FIG. 4 shows a side view of an array's sensor coil.

FIG. 4 shows an example of a sensor coil 2 in a side view. The coil 2 is one sided contacted and fixed or connected to a thermally and preferably also electrically conducting base 5—e.g. a copper, silver or gold base—by one end e1 of its core 3. Integration of such a metal coil base with common FR4 material is e.g. accomplished through a metal core printed circuit board (PCB). The core 3 preferably is grounded through the connection to a grounded base 5. Additionally or alternatively, the winding 4 of the coil is at one end electrically connected to ground.

The other end e1 of the core 3 is protruding above the winding 4, whereby the protrusion length P equals at least the thickness of the winding 4 resp. the thickness of the wire used for winding. Preferably, the protrusion equals at least three times the wire or winding thickness, due to tolerances of the winding 4. Such, the core 3 serves as a mechanical protection of the coil 2 and enabling enhanced heat dissipation. The core diameter 3 is e.g. 0.12 mm.

The core 3 is made from a material that shows a high magnetic permeability. The initial relative magnetic permeability is at least 5000, for example 60 k. As known, the initial relative magnetic permeability describes the linearised relation between the applied magnetic field $B_{aus}$ and the resulting magnetic field B if the material has not been magnetised before. The relationship can be (partly) described by the following equation:

$$P\ B = \mu_{rel}(B_{aus}=0)*B_{aus}$$

The maximum relative magnetic permeability can be much higher, e.g. 200 k or 240 k. The material is chosen such that these values of permeability are given for the measurement frequencies as described above, i.e. between 30 KHz and 300 kHz or 1 MHz or between 60 kHz and 160 kHz. Preferably, the core is a permalloy core or an amorphous metal core.

The connection of the core 3 to the base 5 is thermally and electrically conductive. Placing the end e2 of the cylindrical coil 2 onto a solid conducting base 5 further increases the field penetration of a target/field depth and with the field depth for example resolution of defects of the target.

This construction serves several advantages: the magnetic field strength/inductance is increased, particularly by the chosen core material with high magnetic permeability, and besides the mentioned mechanical protection, the core 3 can be used as a carrier for precise positioning of the coil 2 during assembly. The electrical connection of the core 3 to the conductive and grounded base 5 (e.g. a printed circuit board with a grounded metal core), for example by soldering or gluing of the core 3 to the base 5, allows a reduced noise pickup (suppression of external radiation) and the thermal connection functions as a heat conductor to cool the sensor coils 2. Thus, the resulting eddy current sensor (array) shows advantageously enhanced thermal and electrical stability, due to the electrical grounding also reducing or diminishing any antenna-like influence of the sensor coils 2.

In the example, the sensor array comprises a capacitor 7, parallel to a respective coil 2 as shown in the figure. Adding a parallel capacitor 7 to the coil 2 serves the purpose of an intermediate energy storage/admittance compensation (parallel LC circuit) which results in a higher coil current (power factor compensation) and a reduction of higher frequency noise, resulting in further improved signal-to-noise ratio S/N.

The coil 2 comprises a thermally conducting and electrically insulating encapsulant 6. In the example, the encapsulant 6 encapsules the complete winding 4. Alternatively or additionally, the wire(s) of the winding 4 are directly encapsulated, i.e. jacketed by the encapsulant. As a further option, the encapsulant 6 encapsules the core 3, too (the complete coil 2). This encapsulant 6 serves for thermal protection of the sensor array in harsh measurement environments, e.g. in a metal printer with hot metal as target to be measured. Preferably, the encapsulant 6 is temperature stable at least up to 120° C. or even up to 200° C.

For usage of the eddy current sensor array or a respective eddy current sensor comprising the sensor array according to the invention in vacuum manufacture, the encapsulant 6 preferably has low outgasing properties, e.g. by a Total Mass Loss of 1% maximum (according to standard test method).

As another option, the thermal expansion coefficient (CTE) of encapsulant 6 is advantageously at least about the same as the CTE of the base 5 resp. of a printed circuit board of the eddy current sensor array with the base 6 as a metal core.

Figure 5:
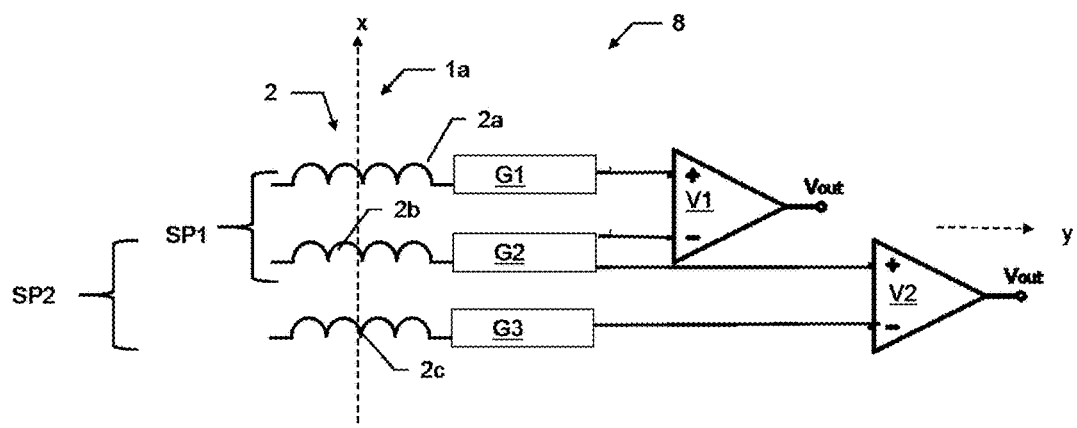
FIG. 5 shows a schematic view of a sensor coil arrangement of an eddy current sensor according to the invention.

FIG. 5 shows a schematic example of an eddy current line sensor 8 as an example of a line sensor of the AM-apparatus of FIG. 1. The sensor 8 comprises a dense array of sensor coils 1a extending in direction of the line x, the sensor coils being lined-up such that the sensor line is gapless, for example embodied as described with respect to FIG. 1 or 2. In this simplified example, the array 1a comprises n=3 sensor coils 2a, 2b and 2c, however, such a sensor might typically comprise hundreds of sensor coils or more arranged in line. Compared to an area or 2D-sensor with sensor coils arranged over a whole plain, a line sensor is easier to manufacture and repair and thus more cost effective. Above that it requires less space and is easier to built-in and drive.

The sensor coils 2a-2c are mounted and driven in parallel whereby each sensor coil forms a differential eddy current sensor probe SP1, SP2 with both its neighboured sensor coils in the line. Each coil 2a-2c of each pair SP1, SP2 is driven by the same driver and the two coils 2a/2b or 2b/2c of each pair SP1, SP2 having opposite magnetic polarity. Hence the sensor 8, having n sensor coils, provides n−1 sensor probes SP1, SP2. Combining the signals of all sensor probes SP1, SP2 in the sensor 8 when moving the sensor 8 along a measurement line y (perpendicular to the line of extension x of the line sensor 8) above the surface, e.g. spaced about 0.1 mm apart from the surface, of an object to be measured results in an area or 2D-image of the object to be measured.

In the example, the sensor coils 2b in the middle forms a first differential sensor probe SP1 with the adjacent sensor coil 2a "above" and a second differential sensor probe SP2 with the adjacent sensor coil 2c "below". As shown, the measurement signals of coil 2a and coil 2b are differential input to a first amplifier V1 and the signals of coil 2b and coil 2c are differential input to a second amplifier V2. In other words, the signal of coil 2a is subtracted from the signal of coil 2b and the signal of coil 2b is subtracted from the signal of coil 2c.

In a typical sensor 8 with hundreds or thousands of sensor coils, also the sensor coils 2a and 2c would not only part of one sensor probe SP1 or SP2, but form a further sensor probe each with its second adjacent sensor coil, other than the sensor coil 2b. Thus, except for the two sensor coils at both ends of the sensor 8, each sensor coil is used twice, the sensor 8 having n−1 differential amplifiers V1, V2, the amplifiers V1, V2 preferably having high gain setting.

The dual use of each coil 2a-2c is a significant advantage in terms of number required coils to cover a whole sensing area. Dividing a measurement area in n measurement strips only requires n+1 coils while still using a differential coil scheme for each strip. The reduced number of differential coils required while still covering the whole area to be measured has many advantages: increase in coil density, reduction of power loss in the total coil array 1a, circuit board space advantage, reduced number of drill holes, better heat distribution and cost reduction.

However, a disadvantage in the dual use of each coil is a potential cross-coupling of the amplifier of each sensor probe to the neighbor, in the example of amplifier V1 to amplifier V2. To prevent amplifier cross-coupling of the signals of sensor probe SP1 to the signals of probe SP2, a decoupling mechanism is applied in form of emitter gain stages. As the expected measurement signals are quite weak, the signal processing circuitry has a high gain and low noise.

For each differential amplifier V1, V2 the coil signals involved are decoupled using a separate emitter gain stage G1, G2 and G3 with a transistor with high current gain and low noise. Having low noise is advantageous as the emitter gain stages G1-G3 are the first components in a respective amplification chain.

In addition to decoupling of the adjacent amplifier stages, the emitter stages G1-G3 also serve as demodulators and pre-amplifiers. Using a demodulator on each input of the differential amplification stage, power fluctuations introduced by the emitter stage are cancelled out.

Each component inserted early in the signal chain has low noise and low impedance/low resistivity of the coils $2a$-$2c$ to ground (GND).

An added advantage of the emitter stages G1-G3 directly following the coils $2a$-$2c$ is that a by the additional gain of the emitter follower, a system gain of 120 dB is achieved easily with low noise using only a dual stage op-amp circuitry (not shown). Less components means less noise and less power loss. In addition to the amplification, the dual stage op-amp also includes a third order lowpass filter (not shown). For further optimization of the S/N, the differential amplifier stage is trimmed towards low noise, high gain and high packaging density, whereas the trailing filter stage is trimmed for high gain, high packaging density, low ripple & low power consumption.

In the example, the direct demodulation scheme as shown low pass filters the signals out of the last amplification stage e.g. at around 5 kHz. These 5 kHz signals can be easily multiplexed in a common AD-converter. Using a 1 MHz ADC, it would be possible to integrate up to 100 analog signals. The high multiplex level allows splitting the signal processing board in a separate analog board and a separate digital board. By splitting the analog and digital boards, the higher noise levels and associated GND decoupling typically encountered in mixed signal boards can be avoided. Simultaneously a high number of power hungry ADC is avoided, and routing of both board gets easier (both: digital & analog). In addition, the interconnect of the two boards can be reduced to a few analog channels for which commercially available micro coaxial connectors exist.

For optimal noise performance the cut-off frequency of the lowpass filter is set to roughly two times the maximal mechanical frequency or below. The expected mechanical frequency can be computed by convoluting the geometrical distribution of the magnetic field of the sensor 8 with the size of the minimal defect to be detected in the object to be measured, combined with the speed of the sensor array.

The presented eddy current sensor allows for in-process measurement of both topology and defects of weight optimized aluminum structures made by additive manufacturing, requiring only a single pass for sufficient resolution. Particularly for measuring defects of object layers made from aluminum based powders, in particular AlSi 10 g, using a sensor driver frequency range of 40 kHz to 300 kHz and particularly 140 kHz in combination with micro coils is preferred.

Figure 6:
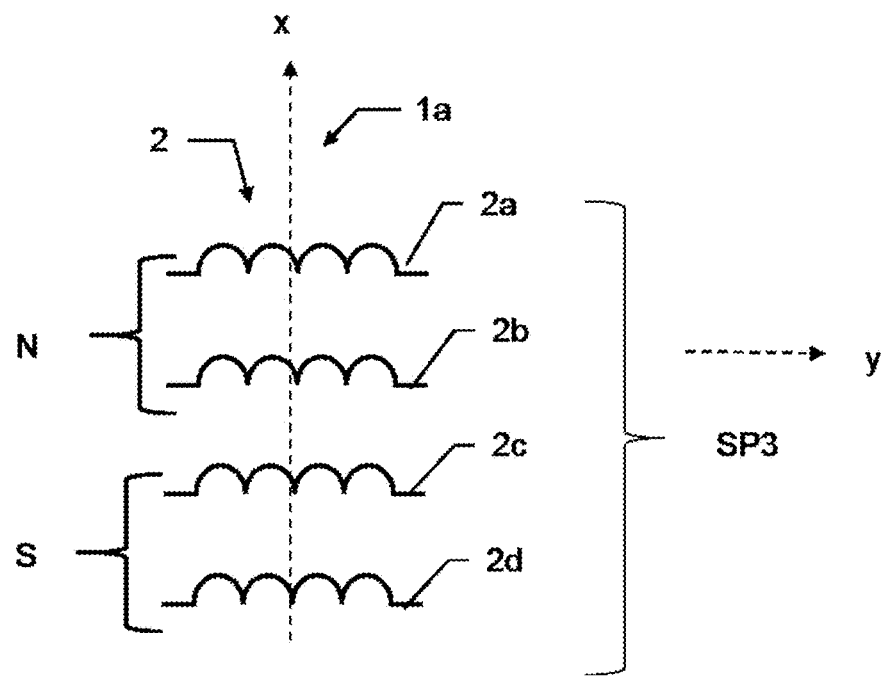
FIG. 6 shows a schematic view of a different sensor coil arrangement.

FIG. 6 shows a schematic view of part of variation of an eddy current sensor according to FIG. 5. For reasons of clarity of the drawing, only the sensor coils $2a$-$2d$ of the sensor array $1a$ of the sensor are depicted.

The magnetic polarity of the sensor coils $2a$-$2d$ is selectable. The drivers of at least every second sensor coil, e.g. $2b$, $2d$ is designed such, that the driving direction can be changed from e.g. a positive electric current to a negative one.

In the embodiment according to FIG. 6, the possibility to change current direction resp. magnetic polarity is used to group adjacent sensor coils $2a$ and $2b$ together by driving them both having same polarity e.g. both being "north"-coils, and to group the two neighboring coils $2c$ and $2d$ together to both being inverse magnetic polarity, namely "south"-coils. The two pairs of sensor coils $2a/2b$ and $2c/2d$ then form a differential sensor probe SP3.

In other words, instead of differential sensor probes SP1, SP2 as shown in FIG. 1 consisting of two sensor coils (of opposite magnetic polarity), a differential "super" probe SP3 is formed of four sensor coils $2a$-$2d$, with two pairs of sensor coils $2a/2b$ and $2c/2d$, the two pairs having inverse polarity with respect to each other. Like with the individual coils, the super coils $2a/2b$ and $2c/2d$ are again arranged to differential pairs and are both active coils.

Of course, this idea can be magnified by grouping each three or four and so on adjacent sensor coils (instead of only two) together to a "super" coil of same magnetic polarity and grouping a, preferably equal, number of neighbored sensor coils together having all the same inverse magnetic polarity.

With the described variation of sensor probe size, a variation of field penetration and/or defect resolution is advantageously enabled.

In case the coils have been configured in to "super coils" as shown in FIG. 4, the resolution in a single measurement pass is reduced compared to differential sensor probe with single sensor coil pairs (reduced number of sensor probes). The resolution can be "restored" by utilizing a second pass or return pass in (inverse) direction y by moving the sensor $1a$ array in direction x of the array with a pitch of for instance half the length of a super pass coil diameter.

As some AM apparatus as the one shown in the example of FIG. 1 comprise only one powder feed reservoir 11, the recoater 12 has to be moved anyway in a forward movement (+y) spreading out powder and a return movement (−y) for going back to its initial position. Thus, the second pass over the layer bed 13 of the recoater 12 and therewith the sensor 8 can optionally be used without any time delay to further improve the—in principle sufficient—measurement made in the first pass. Such a double pass scanning (forward/backward)—with "super coils"-configuration or without—can be used for defect characterization/feature characterization and/or for increasing inspection resolution.

In addition to a lateral offset as described between the first and second pass, other parameters are optionally varied, which is possible both for single coil or "super coil" arrangement. For example, the magnetic polarity of some or all sensor coils $2a$-$2d$ is changed from the first to the second pass.

Or the measurement frequency of the forward measurement is different to the measurement frequency of the backward measurement. Using a lower frequency (high penetration depth), the system will pick up both surface defects/surface variations and buried defects. As a further discriminator for the type of defect, it is possible to use a different frequency in forward movement (i.e. high penetration; 60 . . . 160 kHz) compared to the frequency used in backward movement (i.e. surface; 300 kHz-1 MHz). In other words, penetration depth is selectable in forward pass and backward pass by using different driver frequencies with forward direction focused on buried defect and backwards direction focused on surface defects.

The shape and inspection criteria of each layer is known a-priori to the inspection run. In an optional inspection scheme, it is therefore possible to guide the signal frequency in such a way as to best suit the inspection task: automatic in situ control of penetration depth by means of frequency or supercoils configuration.

Figure 7:
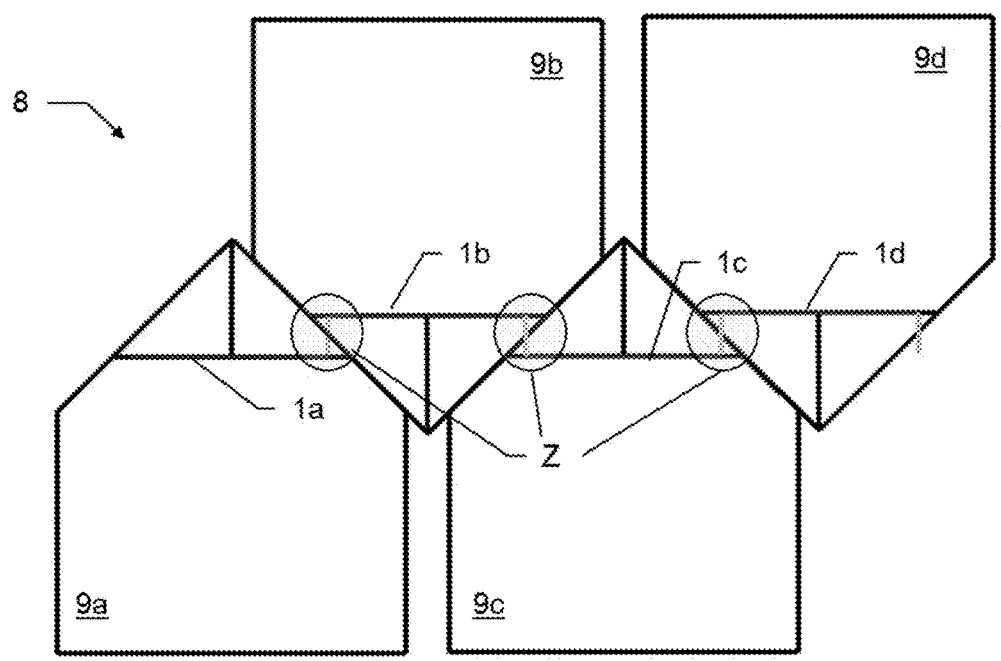
FIG. 7 shows an example of a modular eddy current sensor.

FIG. 7 shows in top view a schema of another embodiment of an eddy current sensor 8. In order to cover a wide measurement line, e.g. the whole build area of an additive layer manufacturing machine, a high number of coils are required. For example, using coils with a diameter of 0.2 mm, in a 45° angled W arrangement and covering a build area of 200 mm width at least 1415 coils are required. Placing these coils on to a single extended circuit board results in a very low yield during production/high cost during assembly on to the target machine and high replacement cost.

Instead as shown a modular eddy current sensor as shown containing many sub boards or PCB-modules 9a-9d results in controllable sensor system. Each one of the modules has e.g. a sensor array length of about 5 mm or 10 mm.

As the drill holes require a certain distance to the board edge, the coils resp. a respective sensor array 1a-d cannot be placed right up to the board edge. This edge clearance is different from manufacturer to manufacturer and is in range of 0.3 mm to 1 mm. Due to the edge clearance, the coils on the board cannot be arranged side by side to form a continuous line of arrays 1a-1d over the whole inspection length.

Instead the boards 9a-9d are staggered as is shown in FIG. 7. In between the boards 9a-9d there is an overlap of one coil, indicated in the figure by the markings Z, so that there is no need to route the signal of the last coil of a respective board, e.g. module 9a, to the next board, e.g. module 9b, for further processing.

Preferably, the sensor's printed circuit board(s) is/are thermally cooling PCB(s) and may have a metal core, e.g. a copper core, for heat conduction. Optionally, the conducting traces for guiding the signals off a full metal board are deposited by way of thin film deposition process in which a first step an insolating layer is deposited on the full metal board. In a second step, in a thin film deposition process the conductive traces are deposited upon the metal. As an option in order to further increase the density of sensor coils on the board, a combination of a full metal board as a metal core plus FR4 deposition is used to form a hybrid metal core PCB.

Although the invention is illustrated above, partly with reference to some preferred embodiments, it must be understood that numerous modifications and combinations of different features of the embodiments can be made. All of these modifications lie within the scope of the appended claims.

What is claimed is:

1. An eddy current sensor array comprising:
a plurality of sensor coils, wherein:
the cross section of a respective sensor coil of the plurality of sensor coils is at most 0.15 mm$^2$,
the sensor coils are lined up along a line (x), wherein each two successive sensor coils of the plurality of sensor coils are alternately offset to the line (x) such that the distance (dx) between a center (c) of each two successive coils in direction of the line (x) is less than the straight distance (s) between the centers (c), and
wherein each coil has a core with an initial relative magnetic permeability of at least 5000,
wherein:
the eddy current sensor array comprises a conductive full or hybrid metal base, whereby the coils are fixed by one end of a respective core onto the base and a respective core is thermally connected to the base.

2. The eddy current sensor array of claim 1, further comprising:
a conductive base, wherein:
the base is electrically grounded and each sensor coil has one side which is electrically connected to the base and thereby electrically grounded.

3. The eddy current sensor array of claim 1, wherein the other end of a respective core protrudes above a sensor coil winding with a protrusion being at least equal to the thickness of the winding.

4. The eddy current sensor array of claim 1, further comprises a thermally conducting and electrically insulating encapsulant encapsulating a respective sensor coil or encapsulating a respective sensor coil winding.

5. The differential eddy current line sensor comprising:
the sensor array of claim 1; and
a plurality of n sensor coils, wherein:
the sensor coils are mounted and drivable in parallel and a respective sensor coil forms a differential sensing probe with an adjacent sensor coil to one side and with another adjacent sensor coil on another side, the plurality of sensor coils therewith providing n−1 differential sensing probes, and
each sensor coil being directly electrically interconnected to a respective emitter gain stage.

6. The eddy current line sensor of claim 5, wherein:
the eddy current line sensor further comprises:
n−1 differential amplifiers, each corresponding to a respective sensing probe, wherein the sensor coils of a respective sensing probe are interconnected to a respective amplifier by way of one of the emitter gain stages, or
a dual stage op-amp circuitry with a third order low-pass filter, or
a sensor array comprising a plurality of sensor coils, wherein:
the cross section of a respective sensor coil of the plurality of sensor coils is at most 0.15 mm$^2$,
the sensor coils are lined up along a line (x), wherein each two successive sensor coils of the plurality of sensor coils are alternately offset to the line (x) such that the distance (dx) between a center (c) of each two successive coils in direction of the line (x) is less than the straight distance (s) between the centers (c), and
wherein each coil has a core with an initial relative magnetic permeability of at least 5000.

7. The eddy current line sensor of claim 5, wherein:
the magnetic polarity of sensor coils is selectable through a selectable current direction to enable magnified differential sensor probes out of more than two sensor coils, and wherein a first part of these sensor coils has the same magnetic polarity and the other part of these sensor coils has inverse magnetic polarity.

8. The eddy current line sensor of claim 5, wherein the eddy current line sensor:
comprises a thermally cooling printed circuit board, whereby each sensor coil is connected to the printed circuit board through a thermally conducting joint,
is modular by comprising printed circuit board modules, or comprises a signal processing board split into a separate analog board and a separate digital board.

9. An additive layer manufacturing apparatus designed for manufacturing an aluminum object layer-by-layer, the apparatus comprising a deposition device for depositing an aluminum powder onto a layer bed and a heating device for consolidating deposited powder, wherein the apparatus comprises the eddy current line sensor of claim 5.

10. The additive layer manufacturing apparatus according to claim 9, wherein the eddy current sensor is movable with respect to the layer bed, has a variable measurement depth in the millimeter-range, or a variable resolution.

11. The additive layer manufacturing apparatus according to claim 9, wherein the additive layer manufacturing apparatus further comprises a temperature sensor designed for in-process measuring of local temperatures of a layer parallel to the eddy current measurement.

12. A differential eddy current line sensor comprising:
a plurality of n sensor coils; and
the eddy current sensor array of claim 1.

13. An additive layer manufacturing apparatus designed for manufacturing an aluminum object layer-by-layer, the apparatus comprising a deposition device for depositing an aluminum powder onto a layer bed and a heating device for consolidating deposited powder, wherein the apparatus comprises the eddy current line sensor of claim 12.

\* \* \* \* \*